United States Patent
Ozzie et al.

(10) Patent No.: US 8,601,598 B2
(45) Date of Patent: Dec. 3, 2013

(54) OFF-PREMISE ENCRYPTION OF DATA STORAGE

(75) Inventors: Raymond E Ozzie, Seattle, WA (US); William H. Gates, III, Medina, WA (US); Thomas F. Bergstraesser, Kirkland, WA (US); Lili Cheng, Bellevue, WA (US); Michael Connolly, Seattle, WA (US); Alexander G. Gounares, Kirkland, WA (US); Henricus Johannes Maria Meijer, Mercer Island, WA (US); Debi P. Mishra, Bellevue, WA (US); Ira L. Snyder, Jr., Bellevue, WA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1499 days.

(21) Appl. No.: 11/536,907

(22) Filed: Sep. 29, 2006

(65) Prior Publication Data
US 2008/0083036 A1    Apr. 3, 2008

(51) Int. Cl.
*H04L 29/06*    (2006.01)

(52) U.S. Cl.
USPC ............... 726/27; 726/18; 713/153; 713/167; 713/176; 380/43

(58) Field of Classification Search
USPC ............ 726/27; 725/115; 713/155; 709/212; 705/35
See application file for complete search history.

(56) References Cited

U.S. PATENT DOCUMENTS

| | | | |
|---|---|---|---|
| 5,263,165 A | 11/1993 | Janis | |
| 5,537,404 A | 7/1996 | Bentlet et al. | |
| 6,064,656 A | 5/2000 | Angal et al. | |
| 6,195,683 B1 | 2/2001 | Palmer et al. | |
| 6,209,039 B1 | 3/2001 | Albright et al. | |
| 6,226,260 B1 | 5/2001 | McDysan | |

(Continued)

FOREIGN PATENT DOCUMENTS

| | | |
|---|---|---|
| EP | 1376309 | 1/2004 |
| EP | 1524580 A2 | 4/2005 |
| EP | 1564622 | 8/2005 |
| WO | 2005022826 | 10/2006 |

OTHER PUBLICATIONS

International Search Report and Written Opinion for PCT Patent Application PCT/US2007/079610, completed Nov. 14, 2008 and mailed Nov. 18, 2008, 13 pages.

(Continued)

*Primary Examiner* — Morshed Mehedi
*Assistant Examiner* — Jason Lee
(74) *Attorney, Agent, or Firm* — Lee & Hayes, PLLC

(57) ABSTRACT

A system that enables a cloud-based data repository to function as a secure 'drop-box' for data that corresponds to a user is provided. The 'drop box' can be facilitated through the use of cryptographic keying technologies. For instance, data that is 'dropped' by or on behalf of a particular user can be encrypted using a public key that corresponds to a user-specific private key. Thus, although the data resides within the large pool of 'cloud-based' data, it is protected since it can only be decrypted by using the private key, which is kept secret. The innovation can further facilitate user-centric secure storage by partitioning the cloud-based repository into multiple partitions, each of which corresponds to specific indexing criteria.

19 Claims, 11 Drawing Sheets

(56) References Cited

U.S. PATENT DOCUMENTS

| | | | |
|---|---|---|---|
| 6,341,127 B1 | 1/2002 | Katsube et al. | |
| 6,434,532 B2 | 8/2002 | Goldband et al. | |
| 6,469,991 B1 | 10/2002 | Chuah | |
| 6,496,482 B1 | 12/2002 | Kubota | |
| 6,707,820 B1 | 3/2004 | Arndt et al. | |
| 6,745,224 B1 | 6/2004 | D'Souza et al. | |
| 6,917,975 B2 | 7/2005 | Griffin et al. | |
| 6,961,318 B2 | 11/2005 | Fichou et al. | |
| 7,002,926 B1 | 2/2006 | Eneboe et al. | |
| 7,065,041 B2 | 6/2006 | Sen | |
| 7,839,999 B2 * | 11/2010 | Suzuki et al. | 380/28 |
| 2002/0055898 A1 * | 5/2002 | Burakoff et al. | 705/35 |
| 2002/0078044 A1 * | 6/2002 | Song et al. | 707/6 |
| 2002/0124053 A1 | 9/2002 | Adams et al. | |
| 2003/0105734 A1 | 6/2003 | Hitchen et al. | |
| 2003/0229623 A1 | 12/2003 | Chang et al. | |
| 2004/0076160 A1 | 4/2004 | Phaltankar | |
| 2004/0098456 A1 | 5/2004 | Krzyzanowski et al. | |
| 2004/0143637 A1 * | 7/2004 | Koning et al. | 709/212 |
| 2005/0138419 A1 | 6/2005 | Gupta et al. | |
| 2005/0144134 A1 | 6/2005 | Hirano | |
| 2005/0188171 A1 * | 8/2005 | McIntosh | 711/200 |
| 2005/0238024 A1 | 10/2005 | Taylor et al. | |
| 2005/0262132 A1 | 11/2005 | Morita et al. | |
| 2005/0289234 A1 | 12/2005 | Dai et al. | |
| 2006/0020700 A1 | 1/2006 | Qiu et al. | |
| 2006/0031518 A1 | 2/2006 | Jennings | |
| 2006/0036904 A1 | 2/2006 | Yang | |
| 2006/0048224 A1 | 3/2006 | Duncan et al. | |
| 2006/0062161 A1 | 3/2006 | Tang et al. | |
| 2006/0107036 A1 * | 5/2006 | Randle et al. | 713/153 |
| 2006/0123005 A1 | 6/2006 | Burnett et al. | |
| 2006/0179327 A1 | 8/2006 | Musa et al. | |
| 2007/0056042 A1 * | 3/2007 | Qawami et al. | 726/26 |
| 2008/0141022 A1 | 6/2008 | Hu et al. | |
| 2009/0031424 A1 | 1/2009 | Ganesan et al. | |

OTHER PUBLICATIONS

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf &identifier=oai:arXiv.org:cs/0502091. Last accessed Sep. 20, 2006.

Non-Final Office Action for U.S. Appl. No. 11/613,364, mailed Dec. 9, 2011, Henricus Meijer et. al., "Data Security in an Off-Premise Environment", 13 pages.

Surowiecki, James, "The Wisdom of Crowds," Doubleday, 2004, 2005, pp. X1-XX1 and 3-137.

Office Action for U.S. Appl. No. 11/613,364, mailed on Jun. 19, 2012, Meijer et al., "Data Security in an Off-Premise Environment", 16 pages.

* cited by examiner

OFF-PREMISE ENCRYPTION OF DATA STORAGE

BACKGROUND

In traditional systems, client-side operating systems are employed to manage relationships between users, software applications, and hardware within a client machine, as well as that resident upon a connected intranet. In most cases, files and other data are locally stored within the resident computer or upon a secure intranet. Thus, security of data can be manageable since the data is most often limited to locally accessible and restricted data stores.

However, the conventional computing paradigm is beginning to shift as maintaining security, indexing data, and the like on each client device can be quite expensive. As network connectivity has continued to improve, it has become apparent that a more efficient computing model includes lightweight (e.g., inexpensive) clients that continuously communicate with third-party computing devices to achieve substantially similar end results when compared to the conventional computing paradigm. In accordance with this architecture, the third-party can provide a 'cloud' of data, devices and services, such that requests by several clients can simultaneously be serviced within the cloud without the user noticing any degradation in computing performance.

Cryptography refers to a conversion of data into a secret code for transmission over a public network. In order to secure data transmission, the original text, or 'plaintext,' is converted into a coded equivalent called 'ciphertext' via a proprietary encryption algorithm. Subsequently, to restore the data to a readable form, the ciphertext can be decoded or decrypted at the receiving end to restore the data into plaintext.

Generally, proprietary encryption algorithms use a key, which is typically a binary number from 40 to 128 bits in length. The 'cipher strength' is a function of the number of bits. For example, the greater the number of bits in the key, the more possible key combinations and, thus, the longer it would potentially take to break the code. The data is encrypted, or 'locked,' by mathematically combining the bits in the key with the data bits. At the receiving end, the key is used to 'unlock,' or decrypt, the code to restore the original data.

Conventionally, there are two cryptographic methods, 'symmetric' and 'public-key' cryptography. The traditional symmetric method uses a secret key, such as the DES standard. In accordance with symmetric cryptography, both sender and receiver use the same key to encrypt and decrypt. Symmetric key algorithms are generally faster than other cryptographic methods, but these methods sometimes involve transmitting a secret key to the recipient which can be difficult and sometimes not secure.

The second method is public-key cryptography, such as RSA, which uses both a private and a public key. Each recipient has a private key that is kept secret and a public key that is published for everyone. The sender employs the recipient's public key and uses it to encrypt the message. Upon receipt, the private key can be used to decrypt the message. In other words, because owners do not have to transmit their private keys to anyone in order to decrypt messages, the private keys are not in transit and are not vulnerable.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can enable a cloud-based data repository to function as a secure 'drop-box' for data that corresponds to a user. This security can be facilitated through the use of symmetric and/or asymmetric cryptographic keying technology. In other words, data that is 'dropped' by or on behalf of a particular user can be encrypted using a public key that corresponds to a user-specific private key. Thus, although the data resides within the large pool of 'cloud-based' data, it is protected since it can only be decrypted by using the private key, which is kept secret.

In order to further facilitate user-centric secure storage, the innovation can provide a partitioning component that divides the cloud-based repository into multiple partitions. Each of these partitions can correspond to any number of indexing criteria including, but not limited to, intended user identity, data type, data content, data topic, author, context, etc.

In other aspects, the system can provide for automatically analyzing data to determine an intended recipient as well as index criteria. This information can be used to determine an appropriate location (e.g., partition) within the data repository to store the data. In still other aspects, this information can be used to locate and/or generate appropriate keying material to encrypt (and/or decrypt) the data.

In yet another aspect thereof, artificial intelligence (AI) and/or machine learning and reasoning (MLR) is provided that employs a probabilistic and/or statistical-based analysis to prognose or infer an action that a user desires to be automatically performed. For example, AI and MLR mechanisms can be employed to infer identity based upon most any number of context and/or biometrical factors. As well, AI and/or MLR can be used to infer a storage location (e.g., partition) based upon criterion including, but not limited to intended user identity, data characteristics, identity of the entity dropping the data, etc.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
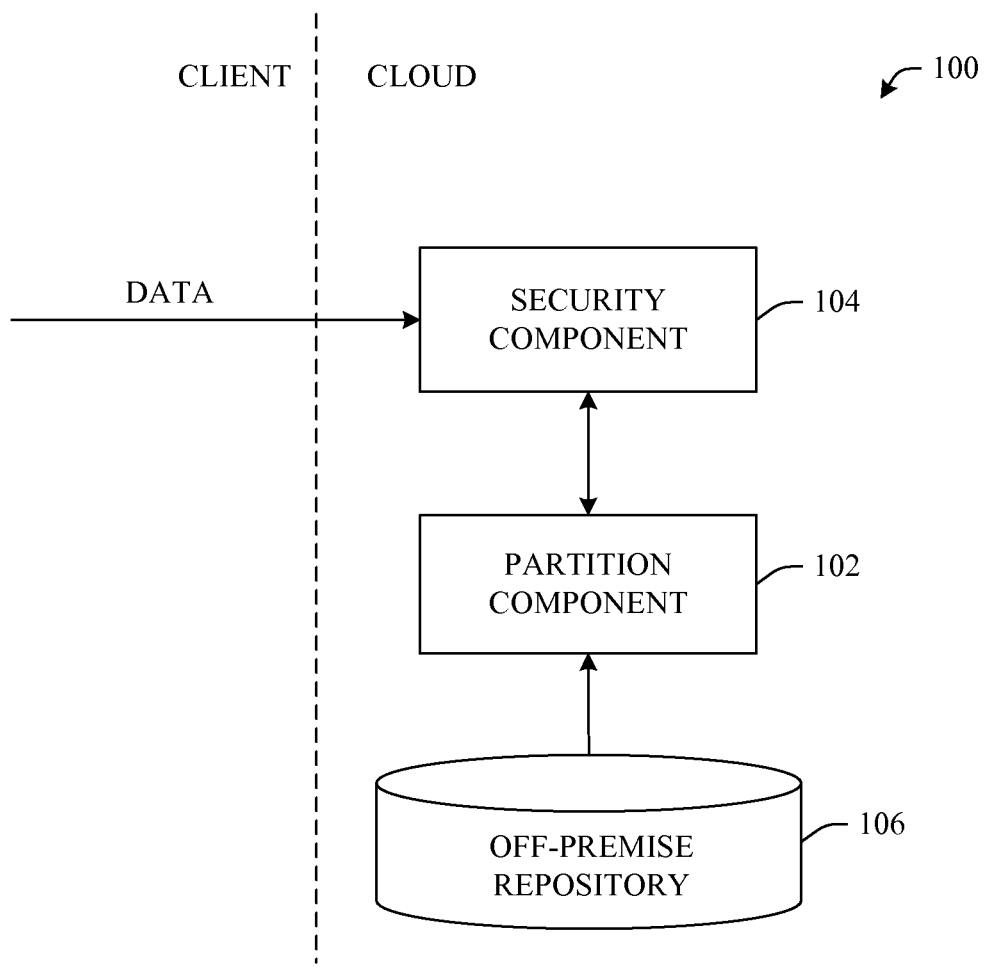
FIG. 1 illustrates a block diagram of a system that facilitates partition and encryption of data storage in accordance with an aspect of the innovation.

The following terms are used throughout the description, the definitions of which are provided herein to assist in understanding various aspects of the subject innovation. It is to be understood that definitions are not intended to limit the scope of the disclosure and claims appended hereto in any way. As used herein, a 'cloud' can refer to a collection of resources (e.g., hardware and/or software) provided and maintained by an off-site party (e.g., third party), wherein the collection of resources can be accessed by a user via a wireless network. The 'off-premise' resources can include data storage services, word processing services, and many other information technological services that are conventionally associated with personal computers or local servers. Moreover, in one aspect, the 'off-premise' resources can be maintained within any number of distributed third-party servers and/or devices.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that includes a partition component 102 and a security component 104 that facilitate establishing a virtual 'drop-box' for encrypted data associated with an identity of an intended or target recipient. The partition component 102 can partition an off-site repository(ies) 106 into multiple partitions thereby establishing 'drop-boxes' associated with an identity, type of data, etc. For instance, each partition of the data repository can employ different encryption strengths and/or algorithms, etc. In order to monetize this scenario, service providers can structure different pricing/fees in accordance with encryption strength. For example, a higher subscription fee can be charged for higher security storage. In other scenarios, company or organization-specific data, even when encrypted, can be stored in a separate partition from that of other companies, organizations and/or individuals. Still further, government rules and/or regulations can require different characteristics of encrypted data.

The system 100 can facilitate encryption of data maintained within each of the partitions such that data can be secured and limited for use by designated services and/or users. This limited use can be effectuated by control of the private key needed for decryption of the stored data. The system 100 can effectively enable information to be stored in partitions within the cloud while preventing unwanted or unintended disclosure of the information. As well, the system 100 can provide mechanisms whereby the information can be decrypted and made available to users, services and applications as desired and/or permitted.

As described above, traditional computing architectures are primarily device-centric where software (e.g., applications) and data conventionally reside on a local computer or accessible intranet. For example, enterprises typically maintain servers on-premise while users most often employ at least one personal computer (e.g., desktop, laptop, palmtop) to access data maintained within one or more of the servers. This traditional model inherently ties users to particular hardware and likely requires local maintenance and support, among other things.

Contrary to the device-centric approach of conventional systems, the subject innovation leverages the user-centric architecture of emerging 'cloud based' systems. For instance, rather than housing applications and data locally, data can be offloaded to a 'cloud' such as a group of one or more communicatively coupled 'off-premise' servers. In this manner, a user's data can be accessed from any network connected computing device. For example, computer software can be executed on a remote server and interactions can be provided utilizing a thin client. However, availability of data in this distributed architecture prompts a need for a mechanism by which data can be secured. In other words, because data is pooled within a cloud, it is important to limit access to data within the cloud-based architecture.

As shown, system 100 can include a partition component 104 that can partition an off-site or 'cloud-based' repository 106 based upon any criteria including, but not limited to, user identity, data type, associated service, associated activity, date created/modified, etc. These individual segments can be viewed as 'drop-boxes' for data maintained within the 'cloud.' Thus, a user, application and/or service can 'drop' or save information into a respective segment based upon a particular partition operation.

As described supra, in accordance with an aspect of the subject innovation, data and application storage can be provided by a myriad of third-party servers. In accordance with the distributed 'cloud-based' model, partitioning of the off-premise data as well as securing transmissions and storage of the data is particularly important to the overall integrity of the architecture.

Because storage occurs within the 'cloud', it can be useful to partition or segment the cloud in order to enhance organization and ease of locating resources. Thus, the partition component 102 can be employed to segment, or virtually segment, the cloud storage (e.g., data repositories 106) as desired. For example, the cloud can be partitioned in accordance with an identity of a user. Thus, all data that corresponds to a particular identity of a user can be located within the same segment of the cloud.

As described supra, increased network connectivity can result in a shift away from private networks and intranets and an increase in the provision of computing services by third party service providers. As will be understood, this shift can increase network efficiency and decrease costs while raising security and privacy concerns.

Turning now to a discussion of the security component 104, typically, service providers often secure data for others and maintain the ability to access and or process data. By analogy, an electronic mail exchange server may prevent account holders from viewing email associated with other accounts, but the exchange server itself can retain the ability to view email of all account holders. This characteristic is particularly important when considering cloud-based storage and subsequent provision of services.

Because hardware resources are not limited to a local environment, more complex security mechanisms (e.g., encryption) can be employed to secure storage of data in the off-premise environment. In aspects, the innovation (e.g., via security component 104) provides for storage of encrypted data by a third-party service provider on behalf of an intended user. In one scenario, the service provider is unable to decrypt the data while in other aspects the service provider can decrypt the information for use as directed by the user. Still further, the innovation can provide for government and law enforcement agencies to override and decrypt encrypted data.

As will be described in greater detail below, an encryption key (e.g., private key) can be maintained at a client device, at an edge device that serves as an access point to the third party network, or within the off-premise environment, such that the encrypted data can be downloaded, decrypted and utilized. In addition, in other aspects, one or more processes of the third-party service can be securely provided with the private key to enable secure processing of the encrypted data.

Essentially, in one aspect, the innovation provides for a public data deposit to be created using public key encryption. A public key can be associated with the namespace of the data store 106 (or segment thereof) that provides for the public data deposit. Thus, users, processes and devices can input or deposit data to the data store (or partition) that is automatically encrypted with the public key associated with an identity of a user.

Subsequently, in order to limit access, it will be understood that a user, process or device would need the corresponding private key to decrypt the data stored in the public data deposit 106. It will be appreciated that in most cases the private key is kept secret however, it will be understood that the innovation provides for the ability to share the private key in order to promote sharing and processing of data. In this aspect, the data store acts effectively as a public 'drop-box' allowing anyone to input encrypted data on their own behalf or on behalf of other users and/or resources. Once input into the data store, the data can only be retrieved and decrypted by users, devices or processes that have access to the private key. Although the aspects described herein are directed to public/private keying cryptography, it is to be understood that other methods of protecting and/or encrypting data can be employed (e.g., symmetric keying) without departing from the spirit and scope of the innovation.

By way of example and not limitation, the 'drop-box' 106 can be employed to automatically maintain data dynamically collected from a variety of devices. For example, location data from individual handheld devices (e.g., cell phones) can be collected, encrypted and maintained in the data deposit. In doing so, the location data can be automatically encrypted with a designated public key. Accordingly, a user can share the corresponding private key with selected processes and/or services, such as a service provider that provides location-based services to the user of the handheld device. Therefore, the service provider can decrypt and use the location data in providing desired services to, or on behalf of, the user.

In another example, health monitoring data can be automatically collected, encrypted and stored within a data repository or cloud-based partition. This data can be accessed by, and shared with, specified health care professionals (e.g., doctors). Moreover, the data can be selectively made available to insurance companies, fitness professionals, coaches, family members or the like based upon preferences or pre-programmed rules.

Figure 2:
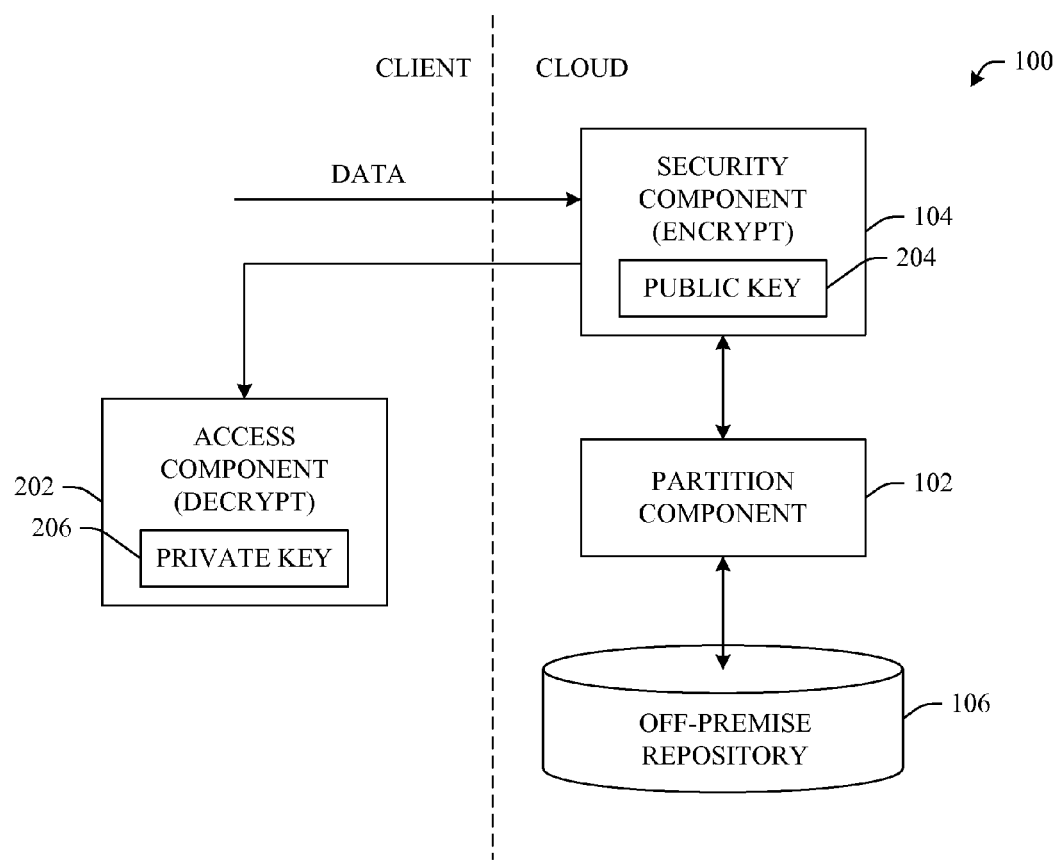
FIG. 2 illustrates a block diagram of a system that facilitates decrypting previously stored encrypted data in accordance with an aspect of the innovation.

FIG. 2 illustrates an alternative block diagram of a system 100 that facilitates securing data within a cloud-based environment. As shown, system 100 can include a partition component 102 and a security component 104 that facilitate maintaining encrypted data in off-site or off-premise repositories 106. Additionally, system 100 can include an access component 202 that enables decryption of previously encrypted data.

In operation, the security component 104 can employ a public key of a user (or service) to encrypt data stored within one of the partitioned segments. When the encrypted data is desired/needed, the access component 202 can retrieve the data from off-premise repository via the partition component 102 and can employ a private key 206 to decrypt the data.

Although the encryption (e.g., security component 104) is shown as an off-premise operation/service and the decryption (e.g., access component 202) is shown as an on-premise operation/service, it is to be appreciated that these components (104, 202) can be co-located within one of the on-premise or off-premise location. As well, it is to be understood that the components (104, 202) can be swapped from the locations shown in FIG. 2 without departing from the spirit and/or scope of the innovation. These alternative aspects are to be included within the scope of this disclosure and claims appended hereto.

Moreover, although the figures illustrated herein employ a partition component 102 in each system, it is to be understood that this partition component 102 can be optional and/or separate from the secure 'cloud-based' data storage functionality. In other words, the partition component 102 is not necessary to be employed with the security component 104. Rather, the partition component 102 enhances organization of cloud-based data storage and subsequent data retrieval.

Figure 3:
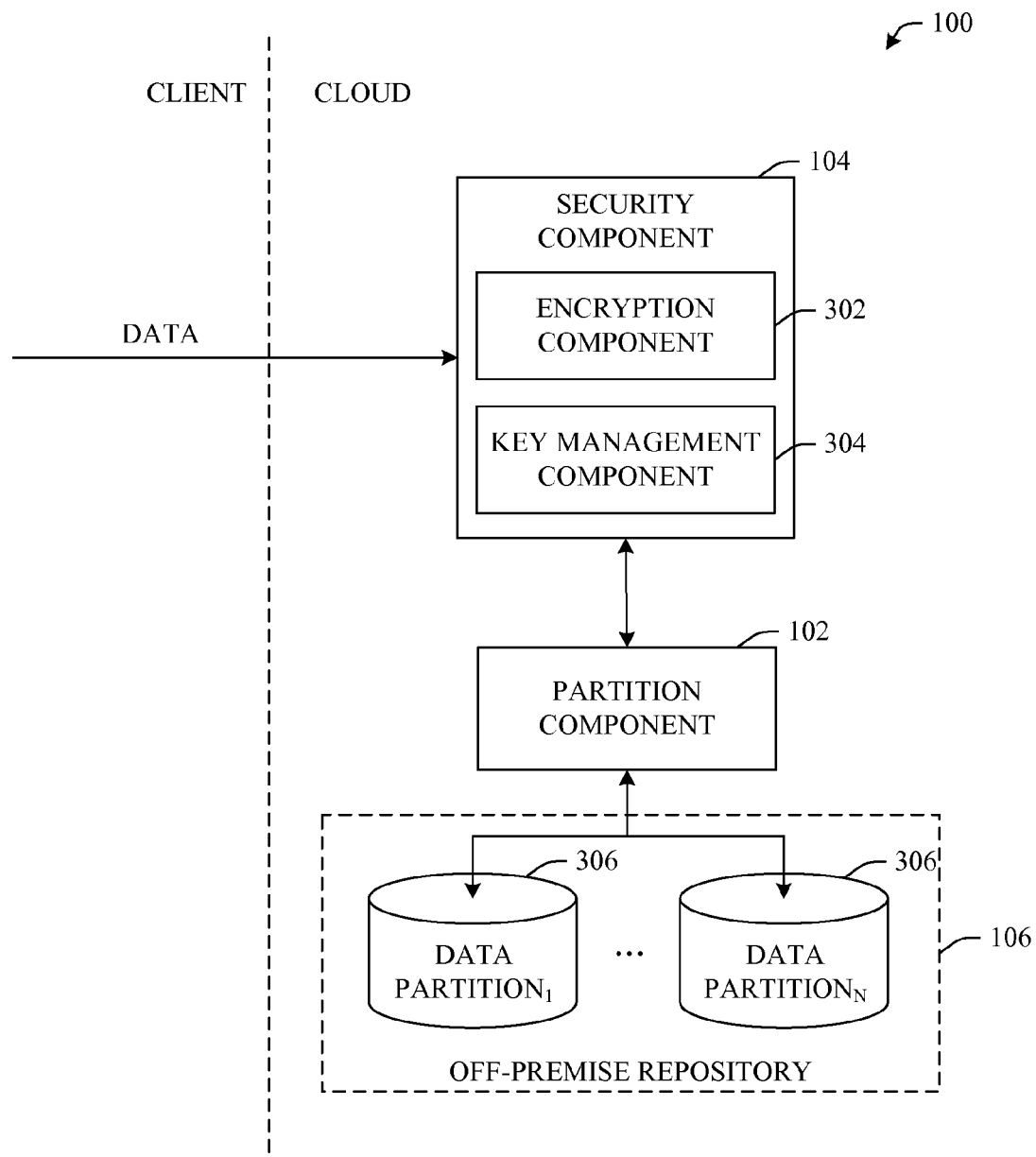
FIG. 3 illustrates a block diagram of a system that employs a key management component that controls access, establishment and/or distribution of encryption keys in accordance with an aspect of the innovation.

Turning now to FIG. 3, an alternative block diagram of system 100 (FIG. 1) is shown. More specifically, the system 100 of FIG. 3 includes a security component 104 having an encryption component 302 and a key management component 304. These components (302, 304) facilitate management of keys and corresponding encryption operation(s). Moreover, system 100 illustrates that the partition component 102 can facilitate segmenting off-site repository 106 into 1 to N data partitions, where N is an integer. It will be understood that 1 to N data partitions can be referred to individually or collectively as data partitions 306.

In operation, the security component 104 can receive data input whereas the key management component 304 can analyze the input to automatically determine an appropriate public key with which to encrypt the input prior to storage into data partition 306. For example, the key management component 304 can analyze an input from a third party service or user to determine an identity of an intended recipient or user. Based upon this identity, the key management component 304 can identify an appropriate public key that can be employed by the encryption component 302 to secure the data.

By way of example, suppose the location data from the earlier example is input into the security component 104. Here, the key management component 304 can determine from the input, an identity of the associated user. For instance, the profile of the sending device can be analyzed to determine the identity. In another aspect, biometrics or context data (e.g., location, affiliations) can be used to determine and/or infer the identity of a user. This identity information can be used by the key management component 304 to locate an appropriate public key to employ for securing the data.

Figure 4:
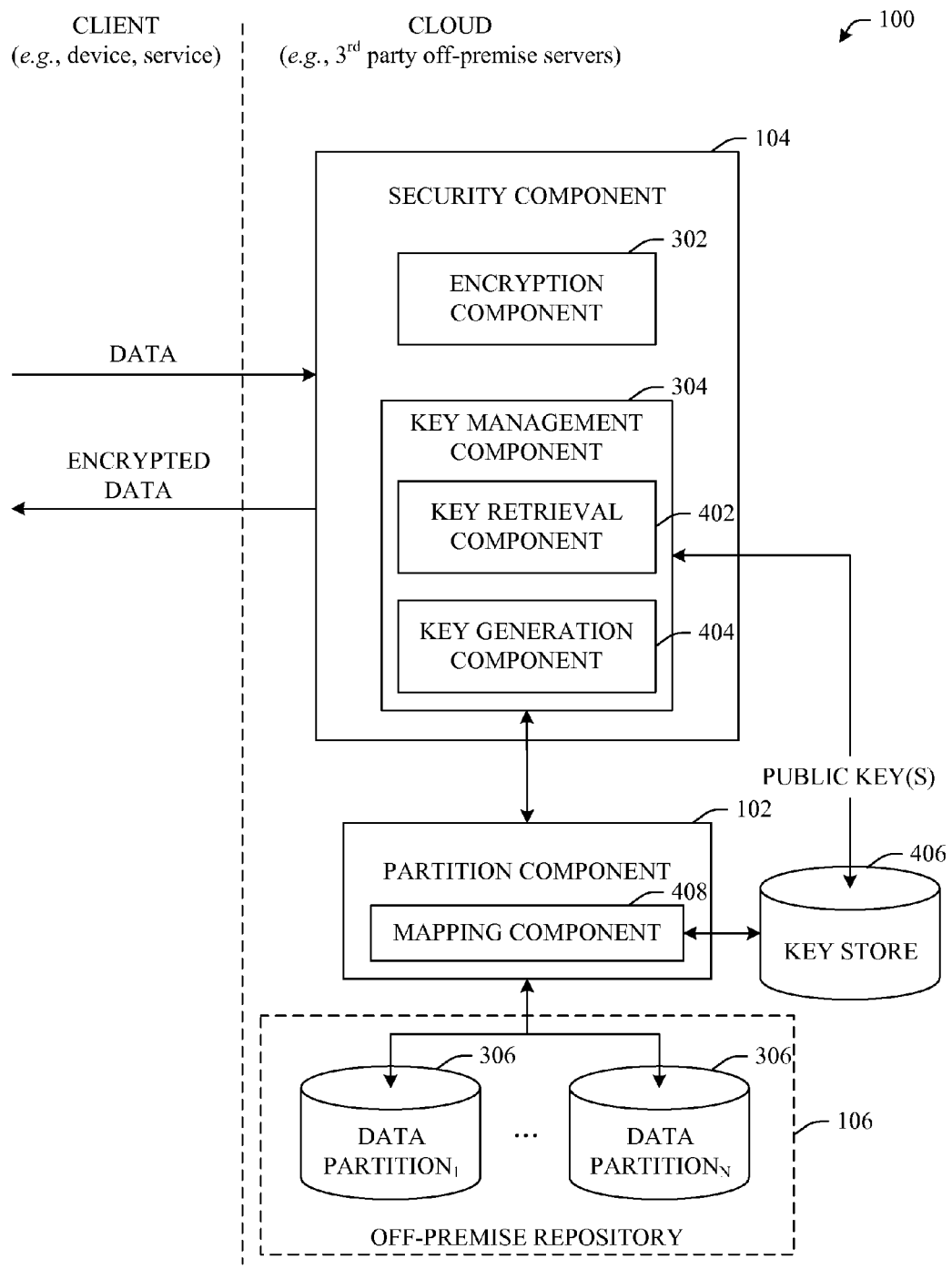
FIG. 4 illustrates a block diagram of a system that employs key retrieval and key generation components that manage keys in accordance with aspects of the innovation.

FIG. 4 illustrates yet a more detailed block diagram of system 100 that facilitates key management and 'drop-box' storage in accordance with an aspect of the innovation. As shown, key management component 304 can include a key retrieval component 402 and a key generation component 404. In operation, the key retrieval component 402 can maintain an index or map of keys associated with a particular end-user or intended user identity(ies).

Upon analyzing the input, the key retrieval component 402 can search a key store 406 for a key that matches a determined and/or inferred identity. If the key is available in the key store 406, the key retrieval component 402 supplies the key to the encryption component 302 to encrypt the data. Although the key generation component 404 and/or the key store 406 are illustrated within the cloud environment, it is to be understood that these components (404, 406) can reside within the client environment or some other third party environment and accessed therefrom without departing from the spirit or scope of the innovation and claims appended hereto.

If, however, the key is not available in the key store 406, the key generation component 404 can be employed to establish and/or generate a key to be employed to encrypt the data. It will be understood that the key generation component 404 can employ proprietary mathematical algorithms to establish keys. As described above, it is to be understood that any asymmetric keying technique including, but not limited to Diffie-Hellman, DSS (Digital Signature Standard), ElGamal, RSA, PGP, Secure Socket Layer (e.g., TLS), etc. can be employed to secure data prior to storage into a data partition 306 (or other cloud-based store). Whether the key generation component 404 resides within the cloud environment (as shown) or within the client or third party environment (not shown), the appropriate portion of the cryptographic key pair can be sent to the necessary parties using secure transmission techniques (e.g., digital envelope, tunnel). This secure transmission can maintain the proprietary characteristics of the keying material.

Once a key is generated, it can be stored within the key store 406 for later use. In other aspects, e.g., symmetric keying systems, the encryption key can be destroyed as the intended user will be able to decrypt the data using the same or similar key. Although the key store 406 is shown in the cloud-based off-premise location, it is to be appreciated that the key store 406 can be located within the client environment without departing from the spirit and/or scope of the innovation and claims appended hereto.

With continued reference to FIG. 4, once data is encrypted (e.g., via encryption component 302), the partition component 102 can employ a mapping component 408 to map the data to an appropriate data partition 306 for storage. For instance, the mapping component 408 can employ the identity of an intended user, service, owner, author, etc. to map the data to a particular data partition 306. As well, other criterion including, but not limited to, data type, content topic, content sensitivity, user affiliation, organization, etc. can be employed to index or map the data to an appropriate partition or set of partitions 306.

Figure 5:
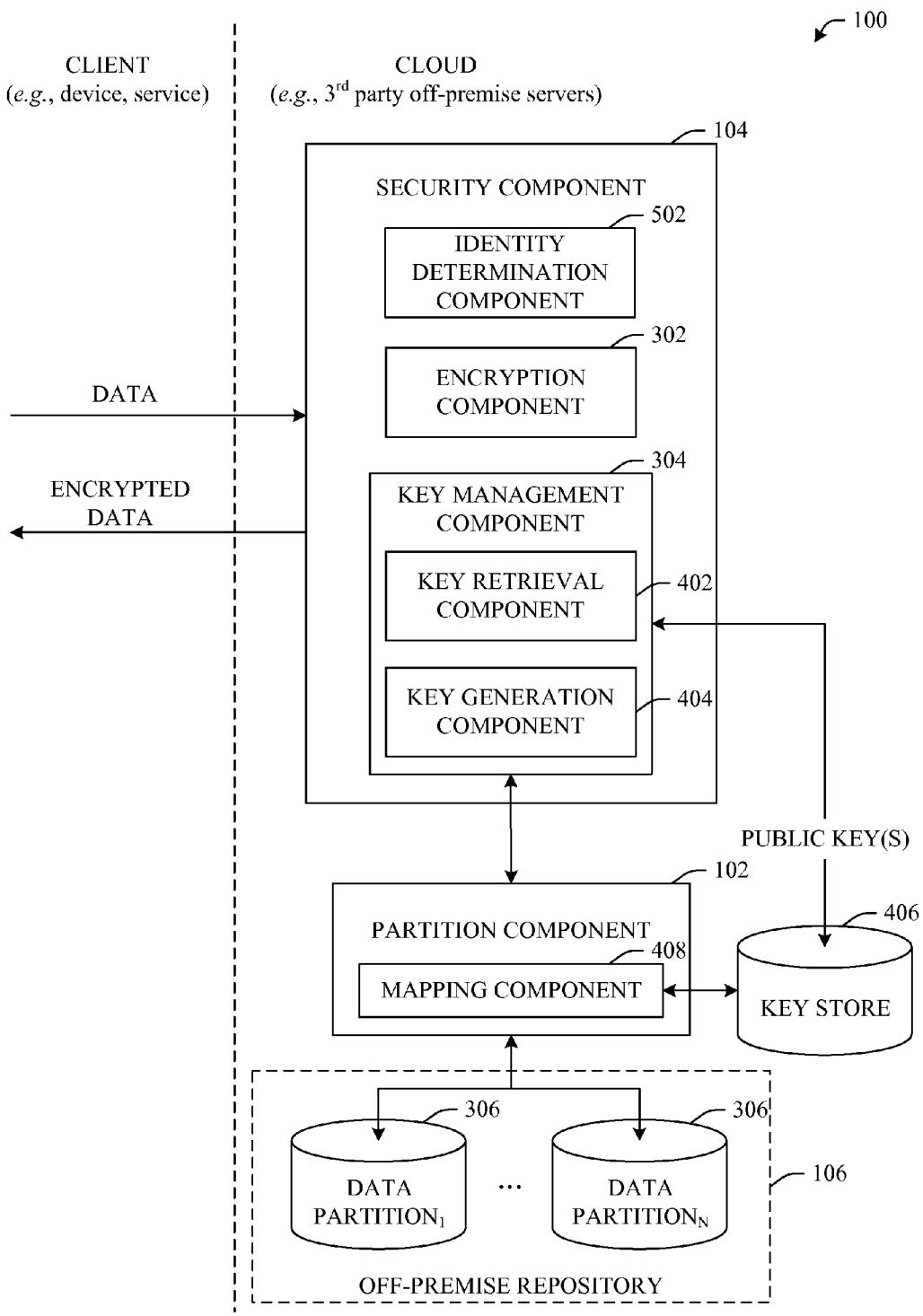
FIG. 5 illustrates a block diagram of a system that employs an identity determination component that facilitates establishment of identity that can be used in key and storage management in accordance with aspects of the innovation.

As described above, 'identity' can be a criterion which the system 100 can employ to determine and/or infer key retrieval, generation, distribution as well as partition generation and/or selection for storage. FIG. 5 illustrates an alternative block diagram of system 100 that facilitates an identity determination component 502 to establish an identity in accordance with an intended user, owner, service, etc. with respect to a data request and/or input. As will be understood upon a review of the related applications identified supra, any single user, owner, service, etc. can have multiple 'identities' that correspond to specific context (e.g., location, engaged activity), affiliations, interests, preferences, etc.

In accordance with aspects of the innovation, each of these 'identities' can be associated to different keys used in encryption. By way of example, a user's 'home' identity can be employed to use a 'home public key' where a 'home private key' must be used to decrypt and/or access any information encrypted with this key.

Figure 6:
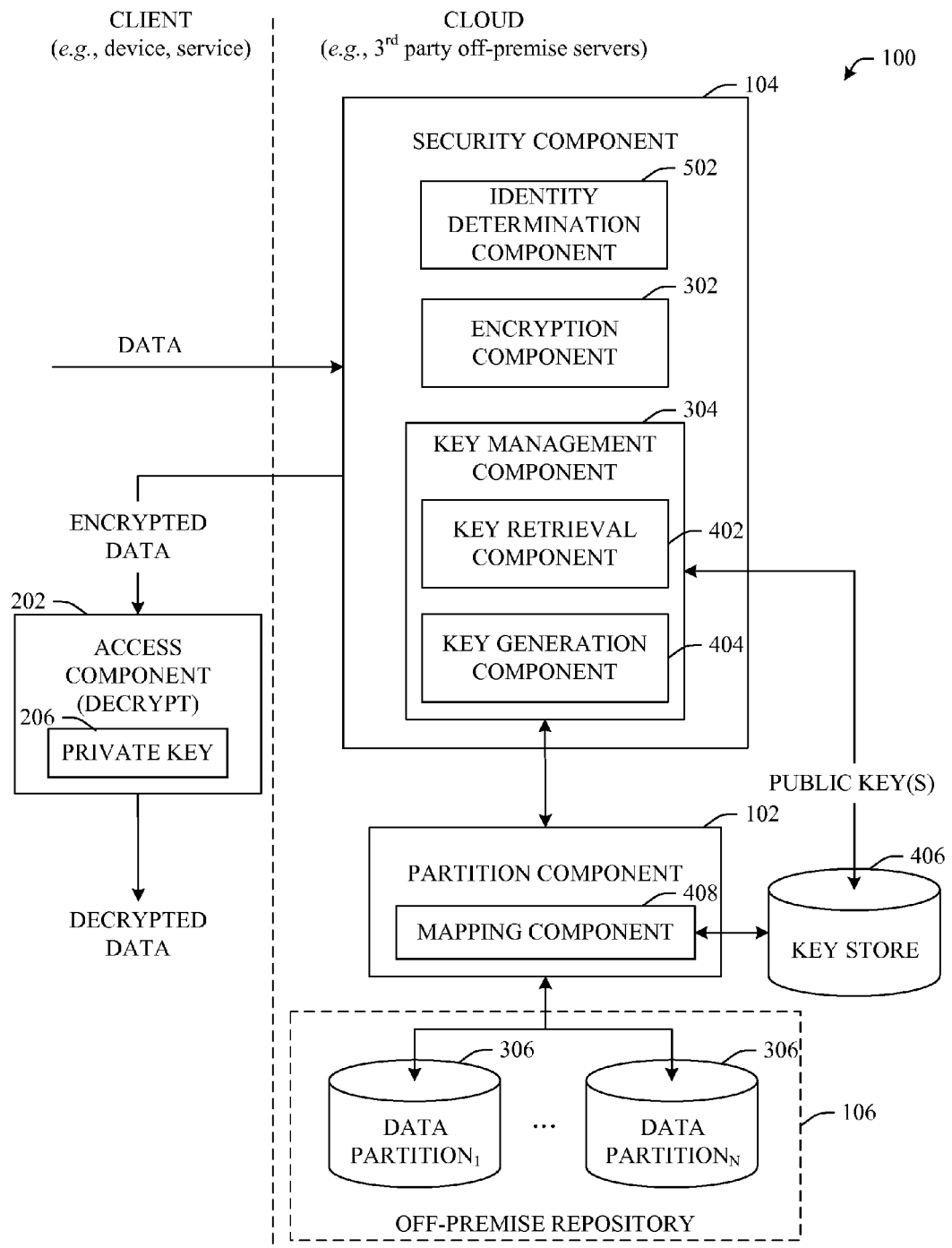
FIG. 6 illustrates a block diagram of a system that employs an access component that can decrypt encrypted data in accordance with an aspect of the innovation.

FIG. 6 illustrates an alternative block diagram of system 100 where the private key 206 can be sent to the client (e.g., device, service, user) for decryption of encrypted data. For example, the key management component 304 can transfer the key needed to decrypt a particular data element from the off-premise environment to the access component 202 located in the on-premise environment.

In accordance with this example, it is to be appreciated that multiple encryption techniques can be used to secure the data and keying material. For example, both DES (Data Encryption Standard) and RSA can be used together to encrypt data and secure keying material. It will be understood that DES provides for fast decryption while RSA provides a convenient method for transmitting the secret key. In this example, both the DES-encrypted text message and the secret key needed to decrypt the data can be sent from the key management component 304 to the access component 202 via the RSA method in a 'digital envelope.' Thus, the service, user, application, etc. will be able to decrypt the data for use in the client-side environment.

In other aspects, the innovation can employ artificial intelligence (AI) and/or machine learning and reasoning (MLR) mechanisms which facilitate automating one or more features in accordance with the subject innovation. By way of example, various AI-based schemes can be utilized with respect to establishing identities. Additionally, a process for determining which key to employ, where to store, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which identity to establish/select, which key to employ, how to partition, where to store, etc.

Figure 7:
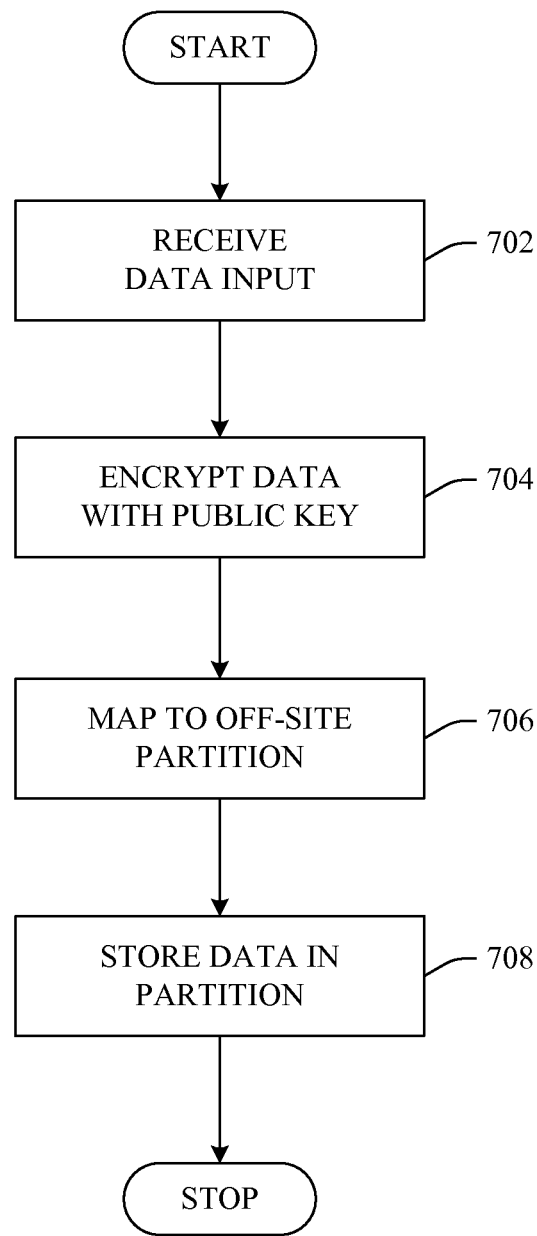
FIG. 7 illustrates an exemplary flow chart of procedures that facilitate storing encrypted data in a partition in accordance with an aspect of the innovation.

FIG. 7 illustrates a methodology of storing encrypted data in a partition in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 702, a data input can be received into an off-premise environment (e.g., cloud). For example, a user can drop (or save) a data element into the cloud environment. The data can be encrypted at 704 in order to prevent unwanted and/or unintentional disclosure or use of the data. As described above, a public key can be generated or retrieved as a function of the identity of an intended user, application and/or service associated with the inputted (e.g., saved) data element. It is to be understood that this identity can be affirmatively provided upon input. Alternatively, the system can analyze the input to determine and/or infer identity. For instance, the system can consider the sender device, biometrics, context, etc. in order to determine and/or infer identity.

The data can be mapped to an off-premise partition (or location) at 704. For instance, the data can be mapped as a function of identity, type, device profile, organization affiliation, engaged activity, etc. By way of more specific example, at 706, data can mapped to a particular partition based upon a current identity together with data type and organization affiliation. In other words, in an example, all word processing documents created by John Doe while working for ABC company can be encrypted and stored into a particular location. Once the particular location (e.g., partition) is selected, the data can be stored at 708.

Figure 8:
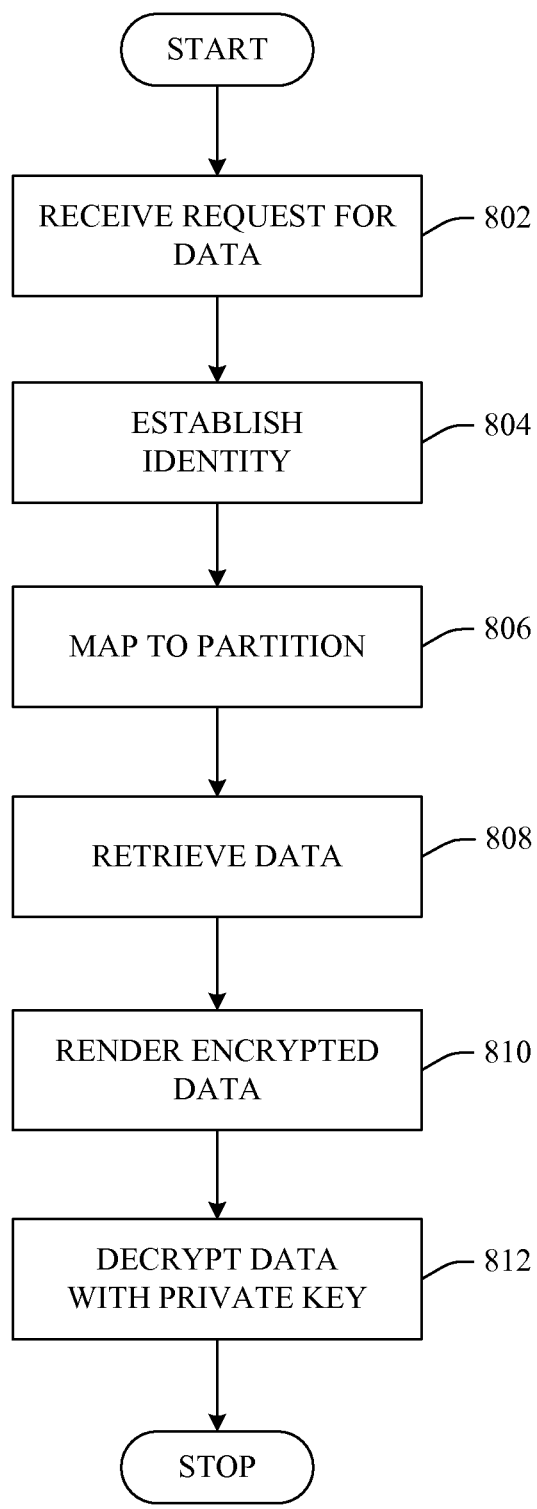
FIG. 8 illustrates an exemplary flow chart of procedures that facilitate retrieval and decryption of encrypted data in accordance with an aspect of the innovation.

Referring now to FIG. 8, there is illustrated a methodology of retrieving and decrypting data in accordance with the innovation. For example, the methodology of FIG. 8 can refer to a scenario in which a user retrieves data from an off-premise store. In another example, the methodology can refer to the scenario where a service accesses and processes off-premise data related to a particular user. At 802, a request for data is received in the off-premise environment.

Identity of the intended recipient or owner of the requested data can be established at 804. As described supra, 'identity' can define specific criteria related to a user. For instance, a user can have an identity related to a current acting capacity such as, work, home, etc. As well, additional characteristics can be factored into an identity, for example, engineering manager at ABC company. This capacity can be mapped to a particular partition at 806 where encrypted data can be retrieved at 808.

At 810, the encrypted data can be rendered to the requestor (e.g., user, service, application). Subsequently, in order to employ the data, an appropriate private key can be employed at 812 to decrypt the data. As described supra, this methodology can be employed to provision services on behalf of a user while maintaining security of encrypted data. Moreover, the key for decryption can be held in secret or transferred to a service in a 'digital envelop' thereby maintaining integrity of the system security.

Figure 9:
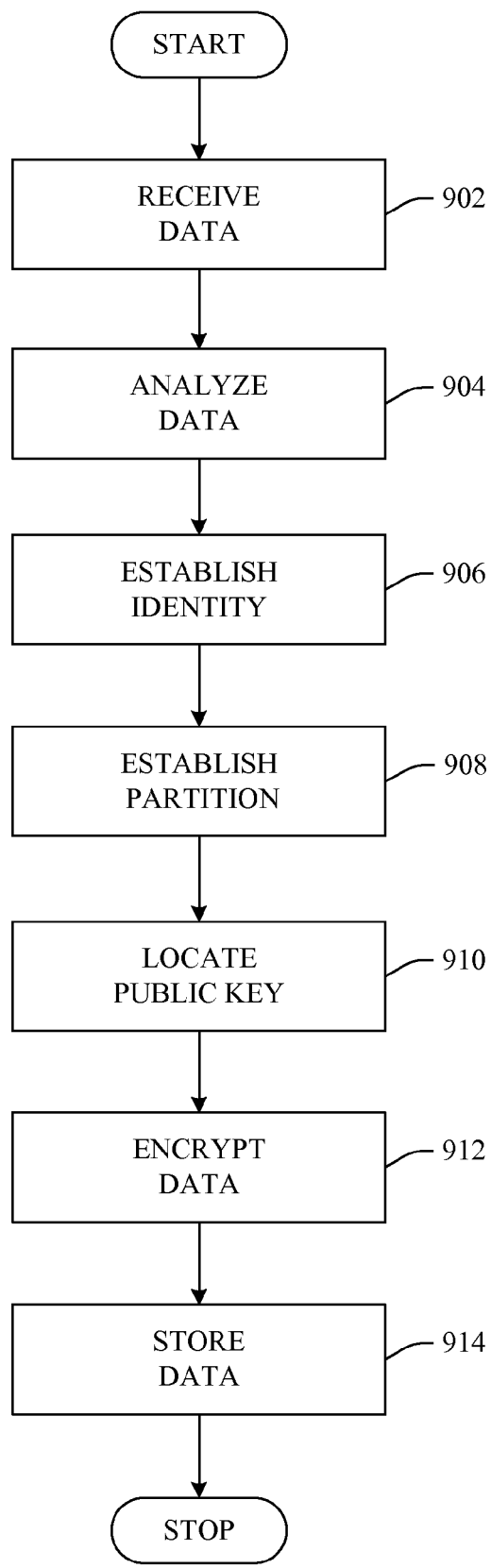
FIG. 9 illustrates an exemplary flow chart of procedures that facilitate partitioning a repository and storing data in the partitions in accordance with an aspect of the innovation.

FIG. 9 illustrates a methodology of partitioning a repository and storing encrypted data in accordance with the innovation. At 902 data is received and analyzed at 904. For example, the data can be analyzed to determine characteristics such as owner, author, type, etc. that can be used to establish identity of an intended user at 906.

This identity, together with the data characteristics, can be used to establish or select an appropriate partition at 908. By way of example, if an appropriate partition exists, this partition can be determined at 908. However, if an appropriate partition is not available, a partition can be established and associated with the identity.

A public key that corresponds to the identity can be located at 910 and used to encrypt the data at 912. Subsequently, the data can be stored in the partition at 914. Although specific methodologies are shown in FIGS. 7-9, it is to be understood that these methodologies are not intended to limit the features and/or functionality of the innovation. Rather, these methodologies are provided to add perspective to the features, functions and benefits of the innovation. Thus, it is to be understood that other methodologies exist and are to be considered within the scope of this innovation and claims appended hereto.

Figure 10:
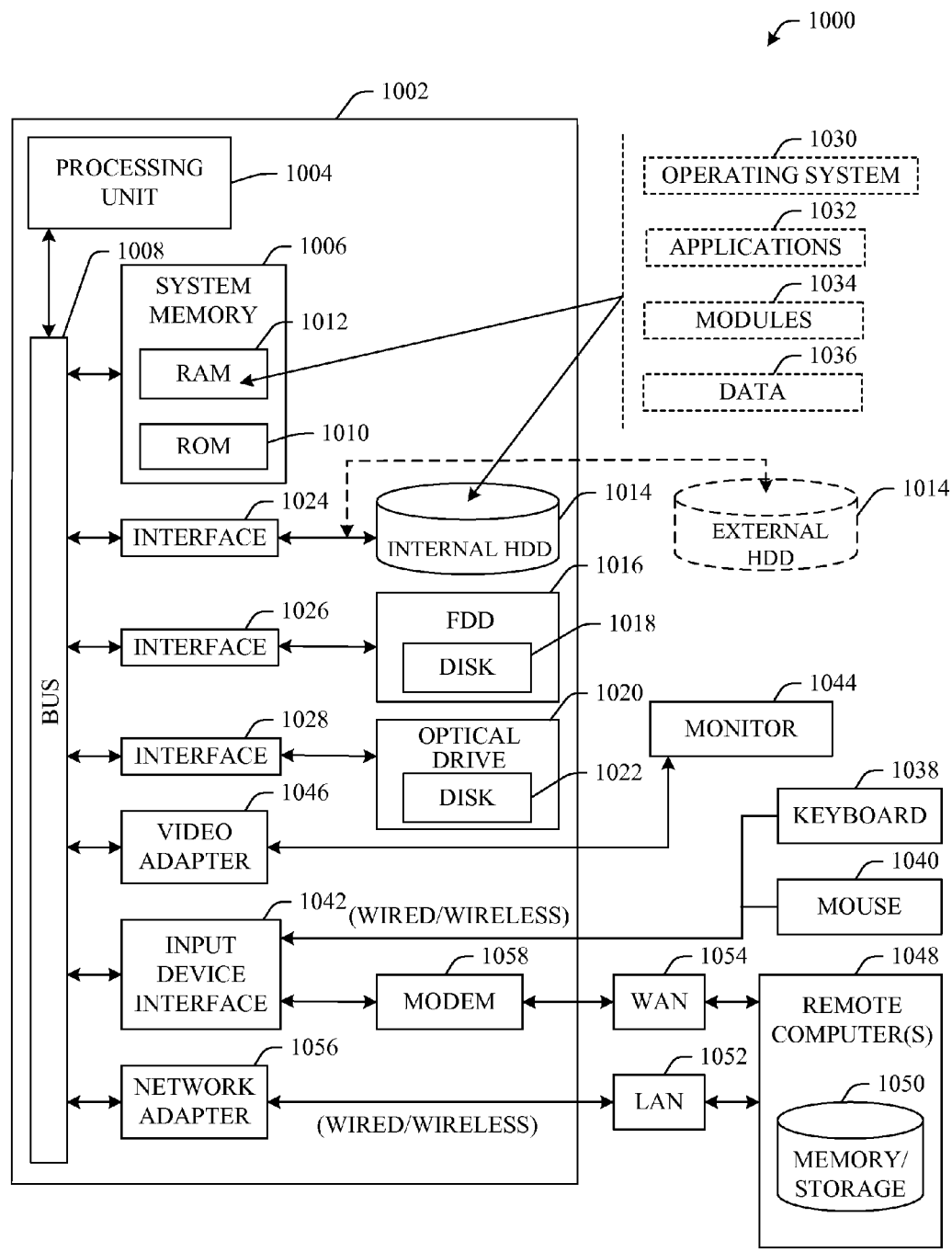
FIG. 10 illustrates a block diagram of a computer operable to execute the disclosed architecture.

Referring now to FIG. 10, there is illustrated a block diagram of a computer operable to execute the disclosed architecture of partitioning an off-premise data repository and/or encrypting and storing data in the repository. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
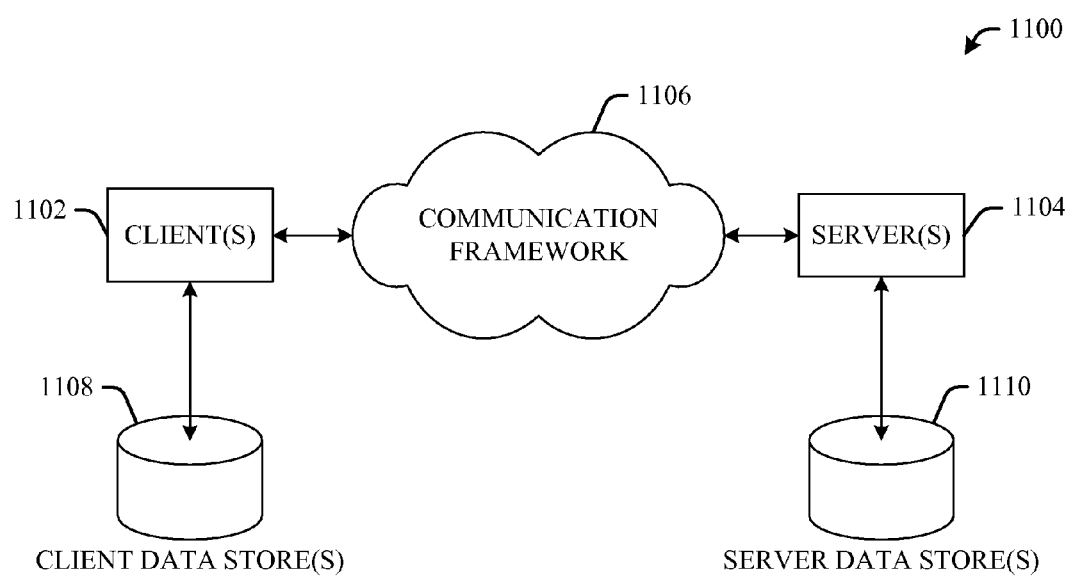
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cloud based system that facilitates security management of data in a cloud based resource store, comprising:
    a processor; and
    a memory that includes components that are executable by the processor, the components comprising:
        a partitioning component to separate the cloud based resource store into a plurality of segments, the plurality of segments comprising one or more virtual drop boxes for encrypted data maintained within the cloud based resource store such that data is dropped into a respective segment, wherein sets of the segments are associated with respective users, in which a first segment of the plurality of segments employs a first encryption strength and a first encryption algorithm with a first pricing structure and a second segment of the plurality of segments employs a second encryption strength and a second encryption algorithm with a second pricing structure such that the first and second segments have different pricing structures in accordance with encryption strength;
        a security component to encrypt a portion of the data associated with one or more sets prior to placement into one of the plurality of segments, wherein the encryption is unique per user; and
        an artificial intelligence (AI) component to employ at least one of a probabilistic or a statistical-based analysis to infer an action via a classifier, such that the classifier automatically determines at least one of: which identity to establish or select, where to store, how to partition, or which key to employ.

2. The system of claim 1, in which the partitioning component is further configured to divide the cloud based resource store based at least in part upon an identity of a user.

3. The system of claim 2, further comprising a mapping component to map the identity to the portion of the data in the one of the plurality of segments.

4. The system of claim 1, in which the security component is further configured to employ a public key of a public/private cryptographic key pair to encrypt the portion of the data.

5. The system of claim 4, further comprising a key management component to associate the public key with an identity of a user.

6. The system of claim 5, in which the key management component is further configured to generate the public/private cryptographic key pair as a function of the identity.

7. The system of claim 5, in which the key management component is further configured to retrieve the public key based at least in part upon the identity.

8. The system of claim 4, further comprising a cloud based or an on-site decryption component to receive and decrypt the portion of the data using a private key that corresponds to the public key.

9. The system of claim 1, in which the security component is further configured to limit decryption ability based at least in part upon service type, service identity, user preference or policy.

10. The system of claim 1, further comprising an identity determination component to establish an identity of a user.

11. A method of securing data in a cloud based environment, comprising:
   receiving data into the cloud based environment, by a computing device, from a plurality of sources;
   encrypting the data, by the computing device, using a public key that corresponds to an identity of an intended user of the data;
   partitioning a resource store located in the cloud based environment into a plurality of segments, the plurality of segments comprising one or more virtual drop boxes for data maintained within the cloud based environment such that data is dropped into a respective segment;
   employing at least one of a probabilistic or a statistical-based analysis to infer an action via a classifier, such that the classifier automatically determines at least one of: which identity to establish or select, where to store, how to partition, or which key to employ; and
   storing, by the computing device, the encrypted data into a first segment of the resource store located in the cloud based environment, in which the first segment employs a first encryption strength and a first encryption algorithm with a first pricing structure and a second segment of the resource store employs a second encryption strength and a second encryption algorithm with a second pricing structure such that the first and second segments have different pricing structures in accordance with encryption strength.

12. The method of claim 11, further comprising establishing the identity of the intended user of the data.

13. The method of claim 12, further comprising locating the public key from a cloud based key storage as a function of the identity.

14. The method of claim 12, further comprising generating the public key as a function of the identity.

15. The method of claim 11, further comprising:
   sharing a private key associated with the public key; and
   decrypting the encrypted data using the private key.

16. One or more computer storage devices storing computer-executable instructions that, when executed by a processor, causes the processor to perform a process comprising:
   partitioning a cloud based store into a plurality of segments comprising one or more virtual drop boxes for data maintained with the cloud based store;
   establishing an identity of an intended target associated with the data;
   locating or generating a public key that corresponds to the identity;
   encrypting the data employing the public key;
   employing at least one of a probabilistic or a statistical-based analysis to infer an action via a classifier, such that the classifier automatically determines at least one of: which identity to establish or select, where to store, how to partition, or which key to employ; and
   storing the data into at least a first segment of the plurality of segments, in which the first segment of the plurality of segments employs a first encryption strength and a first encryption algorithm with a first pricing structure and a second segment of the plurality of segments employs a second encryption strength and a second encryption algorithm with a second pricing structure such that the first and second segments have different subscription pricing structures in accordance with encryption strength.

17. The one or more computer storage devices of claim 16, the process further comprising:
   distributing a private key that corresponds to the public key; and
   decrypting the data using the private key.

18. The one or more computer storage devices of claim 16, in which the cloud based store includes at least data storage services and word processing services.

19. The one or more computer storage devices of claim 16, the process further comprising:
   analyzing context data of the intended target to automatically infer the identity; and
   establishing the first segment for storing the data based at least in part on the inferred identity.

* * * * *